W. L. COLLINS.
Automatic Wagon-Brake.
No. 204,540.  Patented June 4, 1878.
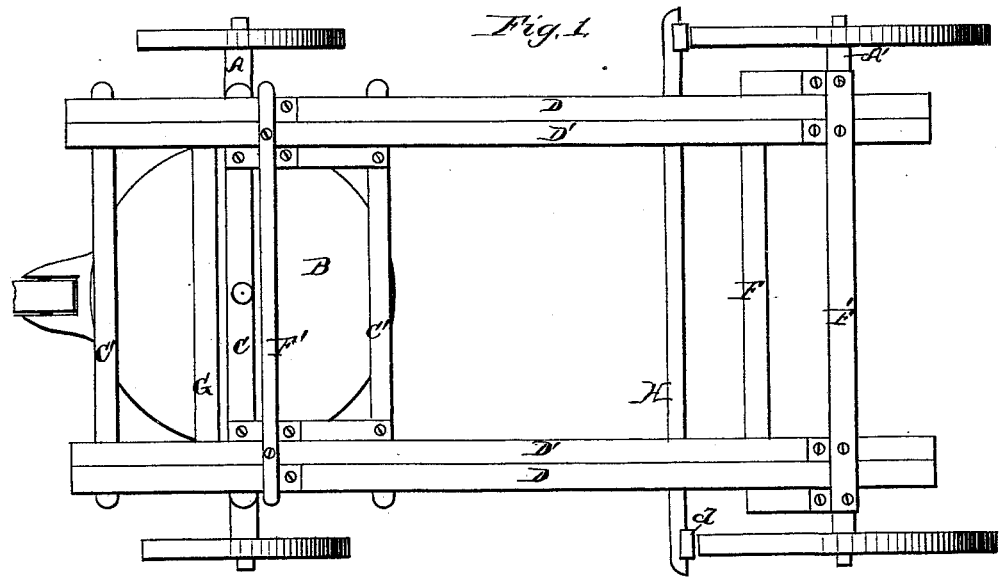
Fig. 1.
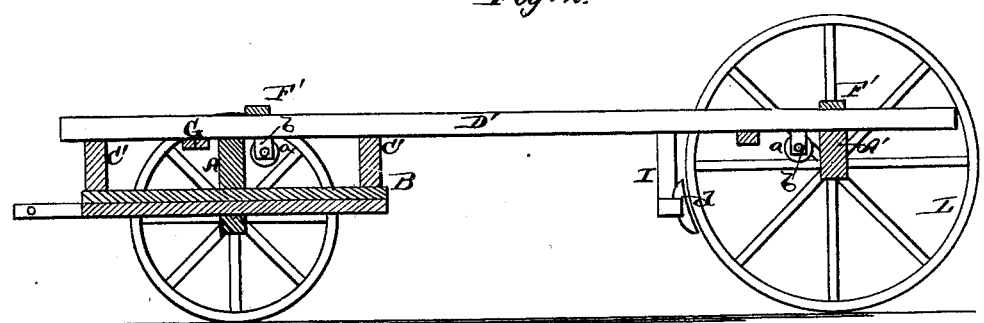
Fig. 2.
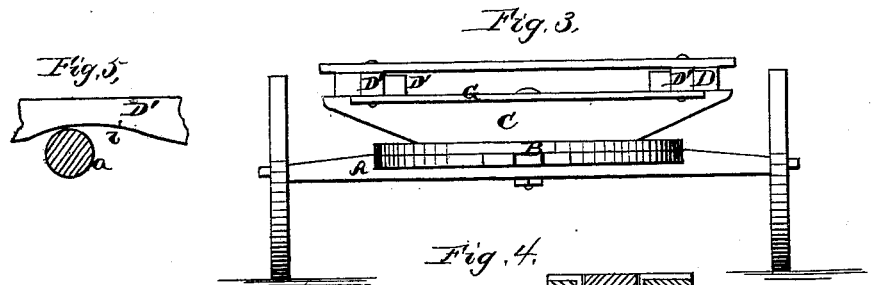
Fig. 3.
Fig. 5.
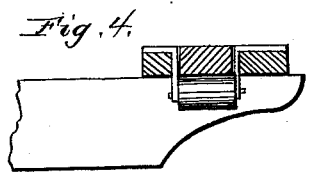
Fig. 4.
Witnesses:
W. C. McArthur
C. L. Evert
Inventor:
W. L. Collins
per Alexander & Elliot,
Attorneys.

UNITED STATES PATENT OFFICE.

WRIGHT L. COLLINS, OF LOUISVILLE, KENTUCKY.

IMPROVEMENT IN AUTOMATIC WAGON-BRAKES.

Specification forming part of Letters Patent No. 204,540, dated June 4, 1878; application filed April 8, 1878.

*To all whom it may concern:*

Be it known that I, WRIGHT L. COLLINS, of Louisville, in the county of Jefferson and State of Kentucky, have invented certain new and useful Improvements in Wagon-Brakes; and I do hereby declare that the following is a full, clear, and exact description thereof, reference being had to the accompanying drawings, and to the letters of reference marked thereon, which form part of this specification.

My invention relates to self-acting wagon-brakes; and it consists in the construction of the running-gear of a wagon, whereby the brake is applied automatically in going down hill, as will be hereinafter more fully set forth.

In order to enable others skilled in the art to which my invention appertains to make and use the same, I will now proceed to describe its construction and operation, referring to the annexed drawings, in which—

Figure 1 is a plan view, Fig. 2 a longitudinal section, and Fig. 3 an end view, of my improved wagon-brake.

A represents the front axle, with fifth-wheel B and frame-work C on top thereof. This frame-work consists simply of a center cross-bar, C, through which the king-bolt is passed, and two other cross-bars, C' C', parallel therewith, one in front and the other in rear of the center cross-bar. To these cross-bars are secured two parallel side bars, D D, which extend rearward over the hind axle A'. To this axle are secured two parallel side bars, D' D', which lie close against the inner sides of the side bars D D; and these side bars are connected on their under sides by a cross-bar, F, a short distance in front of, and parallel with, the hind axle, and also by top cross-bars F' F' near the front and rear ends. The rear ends of the side bars D and the front ends of the side bars D' are supported upon rollers $a$ $a$, mounted in hangers $b$ $b$, as shown.

It will thus be seen that the running-gear of the wagon is composed of two separate and independent frames, sliding one within the other.

The hind axle, with its frame, is pulled along by means of a cross-bar, G, secured to the under sides of the side bars D', near their front ends, said cross-bar G passing in front of the cross-bar C.

H represents the brake-bar, rigidly connected to the side bars D D by arms I I, and provided with the brake-shoes $d$ $d$.

It will readily be seen that in going down an incline or a hill, the frame connected to the hind axle slides forward with said axle until the hind wheels L' L' come in contact with the brake-shoes. The steeper the hill is the harder the hind wheels bear on the brakes.

The under sides of the side bars D' are formed with inclines $i$ $i$, which is for the purpose of having the load on the wagon to assist said bars and their rollers in bringing the rear wheels more rigidly against the brake. Thus the heavier the load is the more the pressure on the brake.

I am aware that it is not new to construct a brake which will be automatically operated by the gravity of the load, and therefore do not broadly lay claim to this feature.

Having thus fully described my invention, what I claim as new, and desire to secure by Letters Patent, is—

1. The combination of parallel bars D D D' D' and cross-bars C' C' and F, with brake-bar H, having arms I I, with brake-shoes $d$ $d$ attached, all arranged substantially as and for purposes set forth.

2. The side bars D D and cross-bars C' C' and F, in combination with side bars D' D', having inclines $i$ $i$, all as and for the purposes set forth.

In testimony that I claim the foregoing as my own I affix my signature in presence of two witnesses.

WRIGHT L. COLLINS.

Witnesses:
I. R. GILBERT,
SAML. J. LOOK.